(12) United States Patent
Sastry

(10) Patent No.: US 6,737,829 B2
(45) Date of Patent: May 18, 2004

(54) PORTABLE ELECTRONIC DEVICE CHARGER AND A METHOD FOR USING THE SAME

(75) Inventor: Chintalapati Sastry, San Jose, CA (US)

(73) Assignee: Janaki Technologies, Inc., Cupertino, CA (US)

( * ) Notice: Subject to any disclaimer, the term of this patent is extended or adjusted under 35 U.S.C. 154(b) by 219 days.

(21) Appl. No.: 10/053,808

(22) Filed: Jan. 18, 2002

(65) Prior Publication Data

US 2003/0137274 A1 Jul. 24, 2003

(51) Int. Cl.⁷ .................... H01M 10/44; H01M 10/46
(52) U.S. Cl. ............................. 320/101; 320/101
(58) Field of Search ................... 320/101, 103, 320/104, 107, 112, 114, 115; 310/67 R, 67 A, 15, 36; 290/42, 53, 54

(56) References Cited

U.S. PATENT DOCUMENTS 3,672,152 A * 6/1972 Reefman 3,937,002 A * 2/1976 Van Haaften

* cited by examiner

*Primary Examiner*—Edward H. Tso
(74) *Attorney, Agent, or Firm*—Blakely, Sokoloff, Taylor & Zafman LLP

(57) ABSTRACT

A portable electronic device charger and a method for using the same are provided. In one embodiment, the charger includes a pendulum mounted to a housing and oscillating in response to movement of the housing. The pendulum includes a first trigger piece and a second trigger piece. The first trigger piece causes the rotation of a first gear element in a gear unit in one direction while the second trigger piece causes the rotation of a second gear element in an opposite direction. The charger also includes an electric generator that has an electric generator shaft rotated by the gear unit. The electric generator generates an electrical output. A circuit communicatively connected to the electric generator receives the electrical output and converts it to an output to be routed via an output coupling in the housing to deliver charge to a rechargeable battery in a portable electronic device.

37 Claims, 7 Drawing Sheets

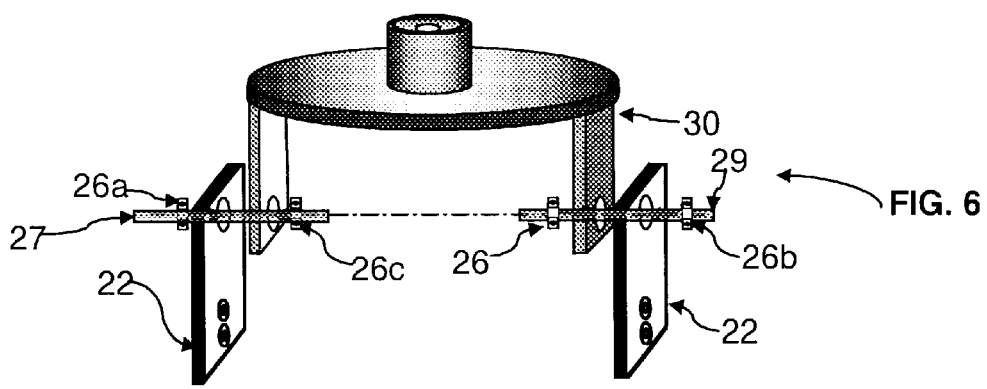
FIG. 6
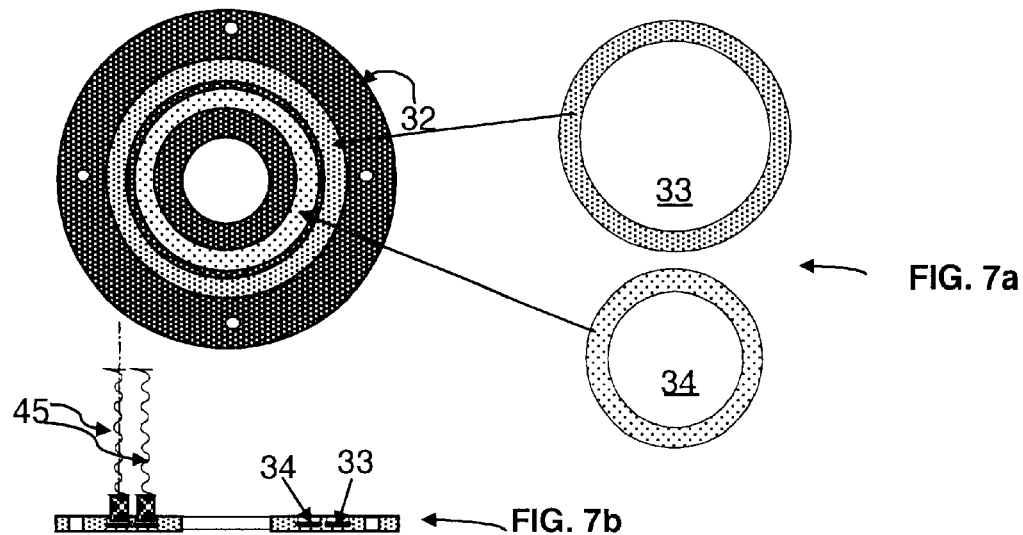
FIG. 7a
FIG. 7b
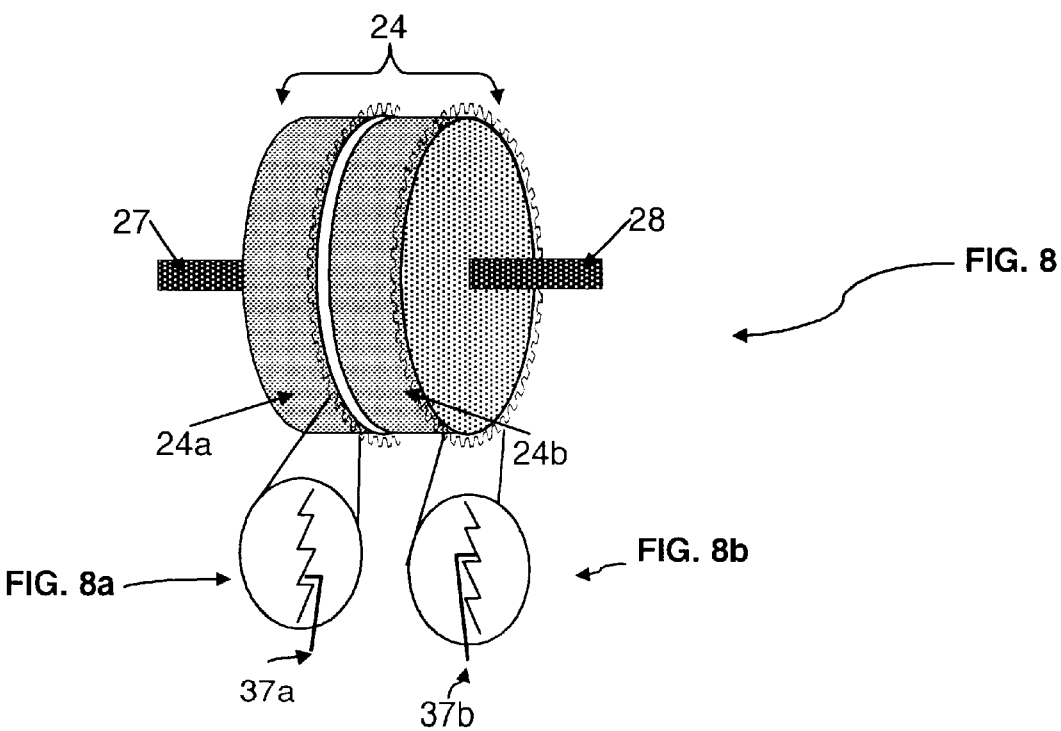
FIG. 8
FIG. 8a
FIG. 8b

PORTABLE ELECTRONIC DEVICE CHARGER AND A METHOD FOR USING THE SAME

FIELD OF THE INVENTION

The invention relates generally to charging electronic devices, and more particularly, to a portable electronic device charger.

BACKGROUND

The proliferation of small portable electronic devices including mobile phones and portable radios in recent years has underlined the need for small rechargeable batteries and battery chargers.

Cell phone users frequently complain of how they are unable to use their cell phone in a critical situation due to low battery levels. Typically, a mobile phone battery lasts about 2 to 5 hours in the talk mode or 2 to 4 days in the standby mode. Currently, rechargeable batteries require an external power source for recharging such as a household electrical outlet.

However, this does not fulfill the demand for re-charging batteries during prolonged outdoor activities or other situations where an external power source is often unavailable. In many situations, like camping, small portable electronic devices such as mobile phones stop functioning due to inadequate battery charge, leaving the user feeling stranded with no means of communication. Furthermore, during emergency situations in remote areas, having a reliable source of power to re-charge or supplement charge and use a mobile phone or a two-way radio for communication is extremely valuable.

Accordingly, what is needed is a charger that is capable of charging a portable electronic device without using chemicals or chemical compounds. The charger would be capable of providing alternate methods for supplementing charge or charging a rechargeable battery often found in portable electronic devices.

SUMMARY OF THE INVENTION

A portable electronic device charger and a method for using the same are provided. In one embodiment, the charger includes a pendulum mounted to a housing and oscillating in response to movement of the housing. The pendulum includes a first trigger piece and a second trigger piece. The first trigger piece causes the rotation of a first gear element in a gear unit in one direction while the second trigger piece causes the rotation of a second gear element in an opposite direction. The charger also includes an electric generator that has an electric generator shaft rotated by the gear unit. The electric generator generates an electrical output. A circuit communicatively connected to the electric generator receives the electrical output and converts it to an output to be routed via an output coupling in the housing to deliver charge to a rechargeable battery in a portable electronic device.

BRIEF DESCRIPTION OF THE DRAWINGS

The present invention is illustrated by way of example, and not limitation, in the figures of the accompanying drawings in which:

FIG. 2a illustrates one embodiment of a front view of the portable electronic device charger;

FIG. 2b illustrates one embodiment of a side view of the portable electronic device charger shown in FIG. 2a;

FIG. 2c illustrates a top view of the portable electronic device charger 5 shown in FIG. 2a;

FIG. 6 illustrates one embodiment of the rotary bracket;

FIG. 7a illustrates one embodiment of the current collector slip ring plate;

FIG. 7b illustrates a cross sectional view of one embodiment of the current collector slip ring plate;

FIG. 8 illustrates a view of one embodiment of the planetary gear unit;

FIG. 8a and FIG. 8b illustrate cut out views of one embodiment of the gear elements.

DETAILED DESCRIPTION

A portable electronic device charger and a method for using the same are described. In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention. Several embodiments are described herein. However, there are other ways that would be apparent to one skilled in the art that may be practiced without specific details.

Figure 1:
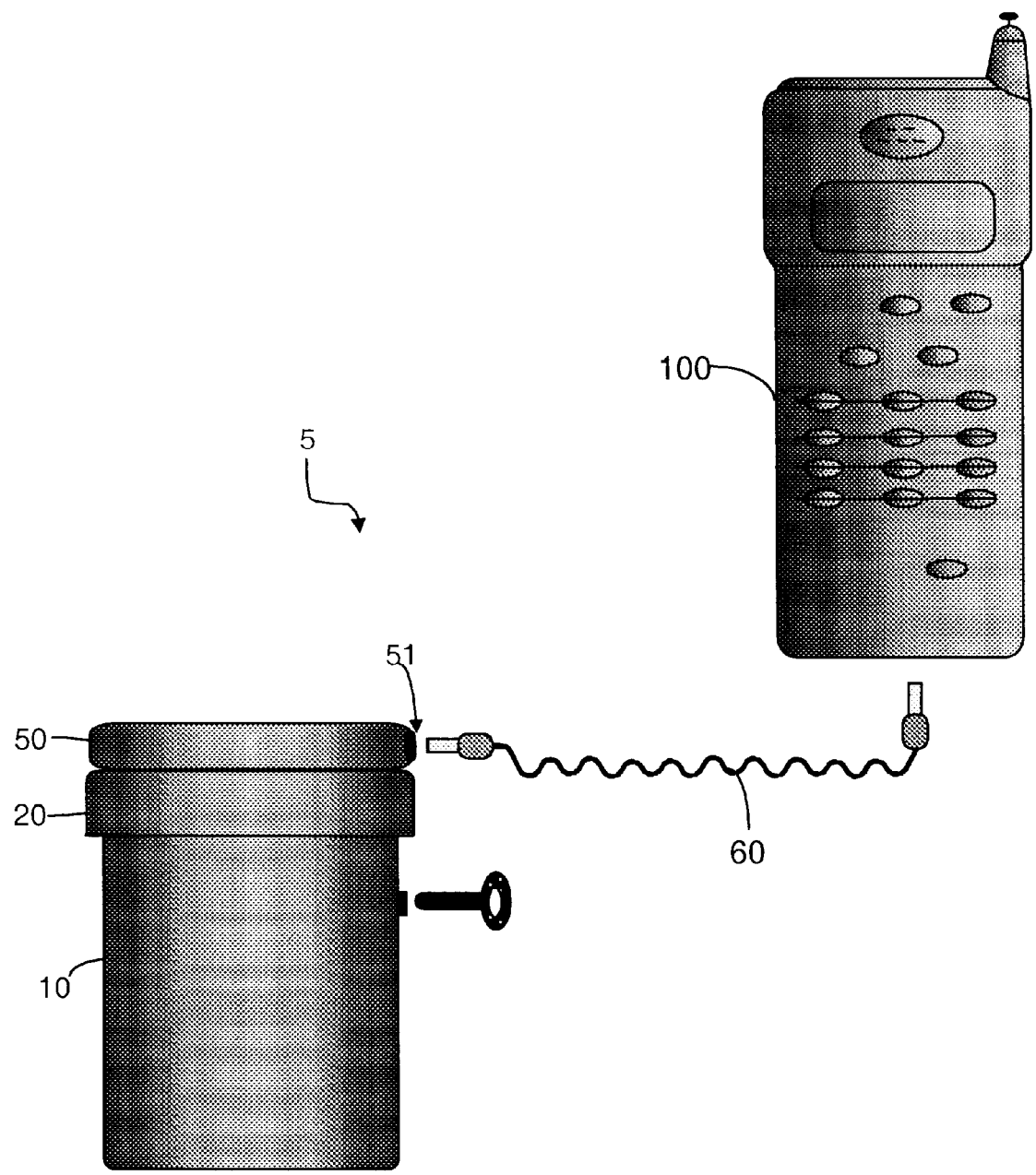
FIG. 1 illustrates one embodiment of a portable electronic device charger with a mobile phone.

FIG. 1 illustrates one embodiment of a portable electronic device charger 5 with a mobile phone 100. The portable electronic device charger 5 is standalone electric charger for use with small portable electronic devices having a rechargeable battery, as for example, the mobile phone 100.

The portable electronic device charger 5 recovers energy from any of three sources of energy generated from within the portable electronic device charger 5 and converts the energy as electrical charge. The portable electronic device charger draws energy from within its three internal sources and converts the energy to electrical charge. These three sources of energy are (1) the pendulum movement occurring from the physical motion of the portable electronic device charger 5, (2) mechanical spring energy of a wound spring, and (3) photovoltaic energy when the portable electronic device charger is exposed to sunlight.

In one embodiment, the portable electronic device charger 5 does not use chemicals or chemical compounds. In alternative embodiments, the portable electronic device charger 5 may use chemicals or chemical compounds in addition to one or more of the energy sources described herein.

As seen in FIG. 1, the portable electronic device charger 5 includes a lower body 10, an upper body 20, an electronic module box 50, and an electric output socket 51. The lower body 10 is coupled to the upper body 20 with screws. The lower body 10 may be removable from the upper body 20 in an alternative embodiment. A cable 60 is plugged into the electric output socket 51 of the portable electronic device charger 5 and the small portable electronic device 100, and thereby the portable electronic device charger 5 is used to charge or run the small portable electronic device 100 having rechargeable battery.

Figures 2A, 2B:
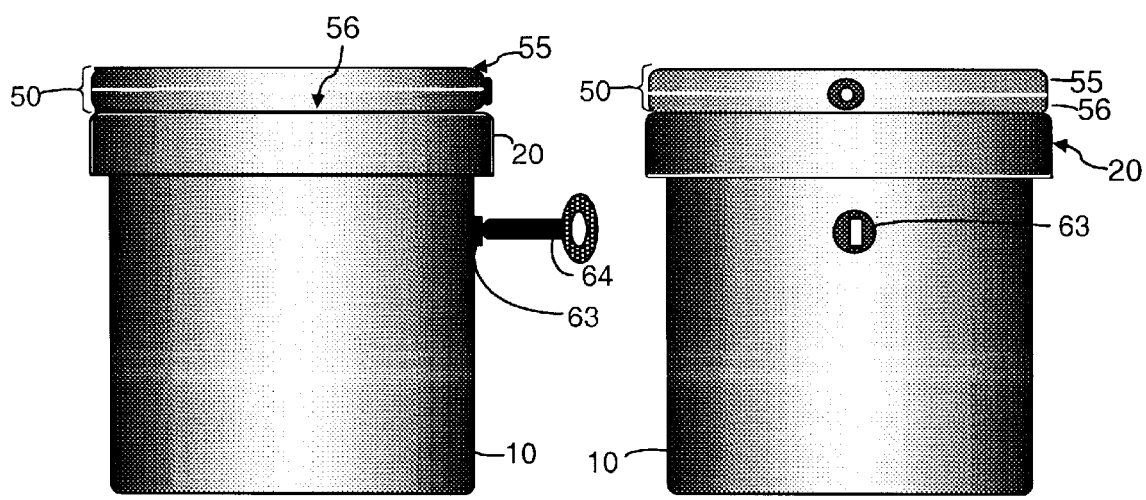

FIG. 2a illustrates one embodiment of a front view of the portable electronic device charger 5. The lower body 10, the upper body 20, and the electronic module box 50 are made of plastic material having high density and impact resistance. In alternative embodiments, the lower body 10, upper body 20, and electronic module box 50 may be made of other materials with high impact resistance. In one embodiment, as shown in FIG. 2a, the assembled portable electronic device charger 5 is about four inches in diameter and overall height and may weigh about 2 pounds.

The mechanical and the electrical components of the portable electronic device charger 5 are housed within the lower body 10 and the upper body 20. In one embodiment, for activation of a mechanical storage unit inside the portable electronic device charger 5, an activation mechanism is used. In one embodiment, the activation mechanism of the portable electronic device charger 5 is a key 64, as for example, a car key, for winding a mechanical spring storage unit inside the portable electronic device charger 5 through a key alignment bushing 63. The key alignment bushing 63 may be customizable by the user of the portable electronic device charger 5 for a choice of keys. In alternative embodiments, the activation mechanism may be a type of assembly other than a key.

FIG. 2b illustrates one embodiment of a side view of the portable electronic device charger 5 shown in FIG. 2a. The electronic module box 50 includes a lower body 56 and an upper body 55 having a transparent window. In one embodiment, the entire electronic module box 50 may be made of a transparent plastic. In alternative embodiments, other transparent materials may be used. In one embodiment, the electronic module box 50 houses a photocell array. The transparent window allows for the activation of the photocell array inside the electronic module box 50 when exposed to sunlight.

In one embodiment, the lower body 56 is adhesively or otherwise bonded to the upper body 20 of the portable electronic device charger 5. In alternative embodiments, the lower and upper bodies 56 and 20 may be attached using other methods of attachment. The upper body 55 is mounted to the lower body 56 with screws and may be detachable to access electronic elements inside the electronic module box 50 by the user to customize preferences.

Figure 2C:
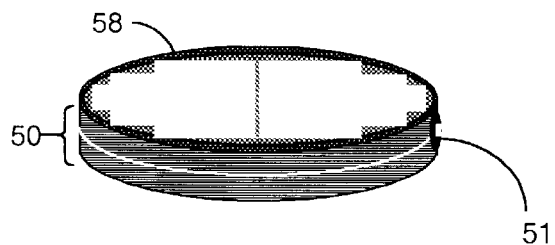

FIG. 2c illustrates a top view of the portable electronic device charger 5 shown in FIG. 2a. The electronic module box 50 includes a photocell array 58 of Photovoltaic cells, electronic controllers, and an electric output socket 51 deliver electric charge to the small portable electronic device via a cable or other type of connection medium.

Figure 3:
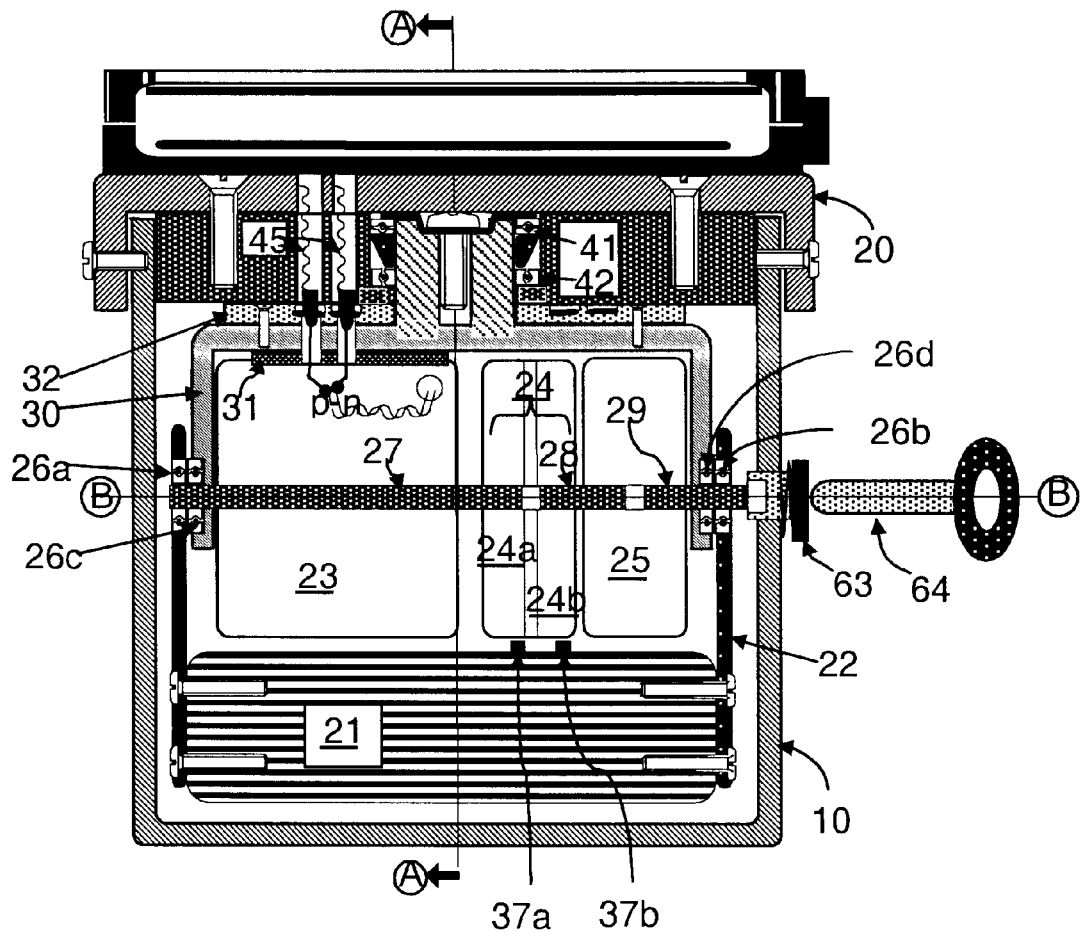
FIG. 3 illustrates a cross section of one embodiment of a portable electronic device charger.

FIG. 3 illustrates a cross section of one embodiment of a portable electronic device charger 5. Most of the mechanical, electrical and electronics elements are assembled and mounted within the upper body 20.

Referring to FIG. 3, a pendulum 21 is attached to pendulum brackets 22 on both sides of the pendulum rigidly with screws. In an alternative embodiment the pendulum may be attached differently. The pendulum is semi circular in shape and is made of steel. This element carries two spring pawls 37a and 37b. The pendulum brackets 22 are made of steel plate and are suspended on bearings 26a and 26b. Thereby, the pendulum 21 has the freedom to oscillate about the axis marked B—B whenever the user moves the portable electronic device charger 5.

A rotary bracket 30 supports the pendulum brackets 22. The rotary bracket 30 is made out of plastic material. The rotary bracket 30 is mounted on a thrust bearing 41, and a ball bearing, 42 and is free to rotate around axis marked A—A. The pendulum 21 mounted on pendulum brackets 22 and suspended by the rotary bracket 30, is thereby free to oscillate and rotate at the same time. The rotary bracket 30 carries an assembly that includes an electric generator 23, a planetary gear unit 24, and a mechanical spring storage unit 25. Three steel shafts including the electric generator shaft 27, the planetary gear unit shaft 28, and the mechanical spring storage unit shaft 29 are mounted to the rotary bracket 30 on ball bearings 26c and 26d.

The body of the electric generator 23 is anchored to the rotary bracket 30 through anchor 31. This anchor prevents the body of the electric generator 23 from rotating when the shaft 27 is rotated. The electric generator 23 provides voltage output to terminals shown as "p-n" on the body of the electric generator 23.

The planetary gear unit 24 has two outer gear elements, 24a, and 24b. The gear element 24a is mounted to the electric generator shaft 27 and the gear element 24b is mounted to it's own shaft 28 sharing commonality with the mechanical spring storage unit 25. The gear element 24b together with the shaft 28 and the shaft 29 is movable axially towards the electric generator 23 when the key 64 is pushed in. A key 64 winds a spring inside the mechanical spring storage unit 25 through the key alignment bushing 63. This axial movement permits activation of the portable electronic device charger 5 by the mechanical spring storage 25 when the key 64 is pushed in.

A current collector slip ring plate 32 is mounted on the upper side of the rotary bracket 30. The current collector slip ring plate 32 is made out of electrically insulating material. A set of spring loaded carbon brushes 45 ride on the current collector slip ring plate 32.

Figure 4:
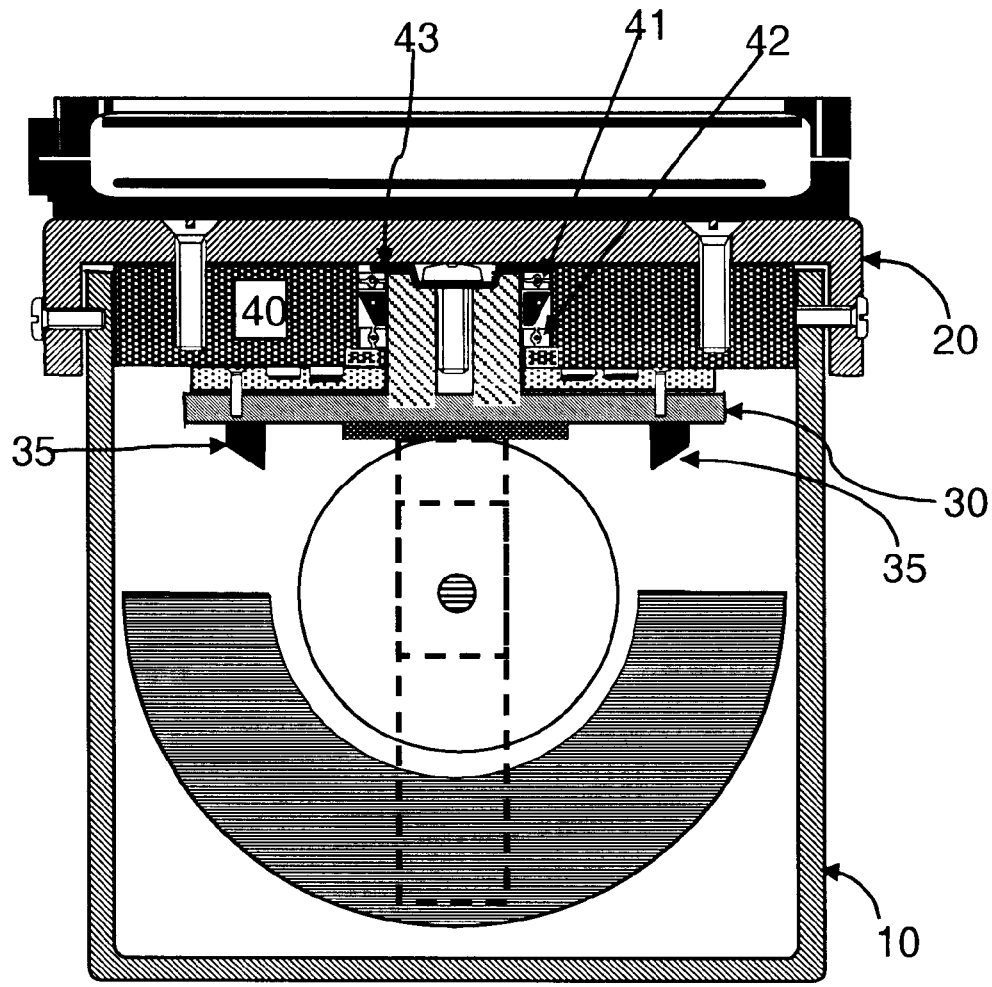
FIG. 4 illustrates a cross section of the embodiment of the portable electronic device charger shown in FIG. 3.

FIG. 4 illustrates a cross section of the embodiment of the portable electronic device charger 5 shown in FIG. 3. The thrust bearing 41 and the ball bearing 42 are mounted on the bearing housing ring 40 and are positioned by ring plate 43 with a screw. This bearing housing ring 40 is made of plastic material and is fixed to the upper body 20 of the portable electronic device charger 5.

In one embodiment, two bouncer blocks 35 adhesively glued to the rotary bracket 30 limit the amplitude or the swing of the pendulum oscillations. However, these bouncer blocks 35 are not necessary to the invention.

Figure 5A:
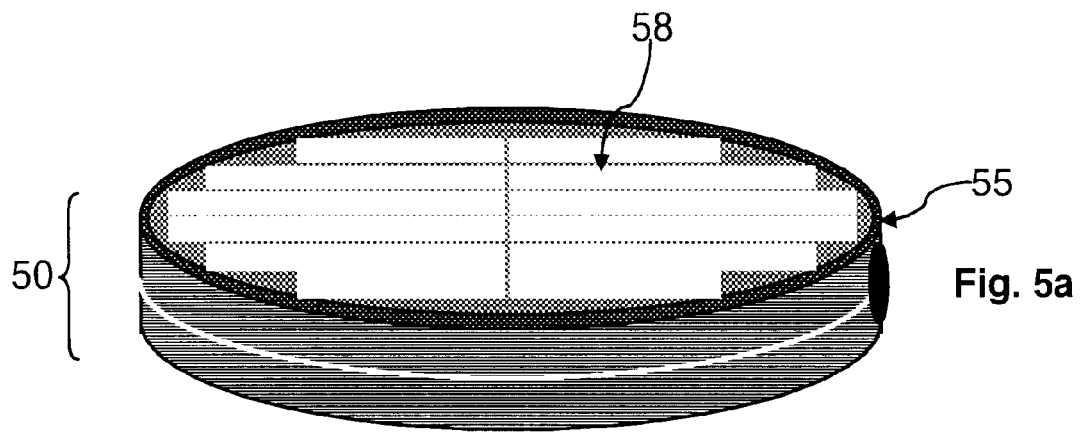
FIG. 5a illustrates a top view of one embodiment of the electronic module box.

FIG. 5a illustrates a top view of one embodiment of the electronic module box 50. The photocell array 58 is visible through the transparent window of the upper body 55 of the electronic module box 50 so that sunlight may be absorbed through the transparent window.

Figure 5B:
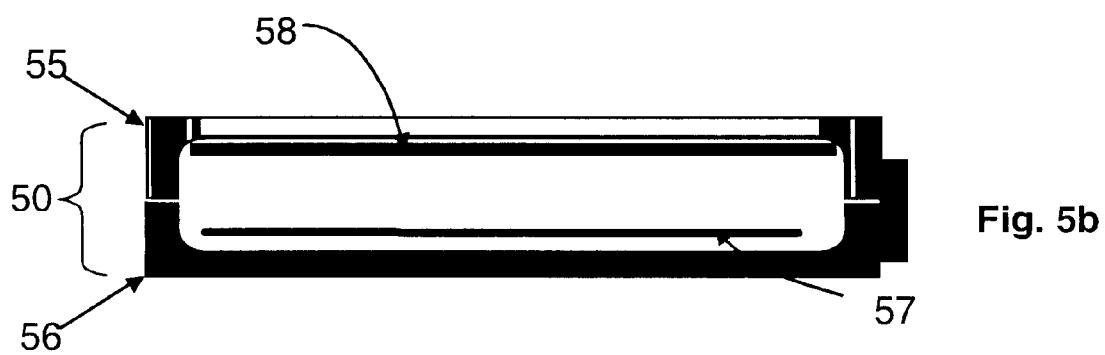
FIG. 5b illustrates a cross sectional view of one embodiment of the electronic module box.

FIG. 5b illustrates a cross sectional view of one embodiment of the electronic module box 50. The electronic components are mounted on wiring board 57 and this board is mounted on the lower body 56. The upper body 55 has a transparent window to allow sunlight to hit the photocell array 58 of photovoltaic cells.

FIG. 6 illustrates one embodiment of the rotary bracket 30. The rotary bracket 30 supports the pendulum brackets 22 on bearings 26a through 26d and shafts 27 and 29.

FIG. 7a illustrates one embodiment of the current collector slip ring plate 32. This plate carries two electrically conducting copper foil rings 33 and 34 adhesively bonded concentrically to the current collector slip ring plate 32. This current collector slip ring plate 32 is mounted with four screws on the rotary bracket FIG. 6, 30. The copper foil rings 33 and 34 are soldered and connected to the electric generator 23, terminals p-n.

FIG. 7b illustrates a cross sectional view of one embodiment of the current collector slip ring plate 32. Two stationary spring-loaded carbon brushes 45 ride on the electrically conducting copper foil rings 33 and 34 on the current collector slip ring plate 32 that rotates along with the rotary bracket 30. The stationary spring-loaded carbon brushes 45 provide an electrically conductive path to deliver electrical charge from the current collector slip ring plate 32 to wiring board 57 (shown in FIG. 5c), terminals p-n. The wiring board 57 is located in the electronic module box 55.

FIG. 8a illustrates a view of one embodiment of the planetary gear unit 24. This planetary gear unit includes two gear elements 24a and 24b. The spring pawls 37a and 37b associated with the gear elements 24a and 24b are illustrated as cut outs in FIG. 8b.

Referring to FIG. 8a, each of the gear elements 24a and 24b of the planetary gear unit 24 are driven by corresponding spring pawls 37a and 37b. These spring pawls ratchet on the saw tooth and thereby rotate the gear elements 24a and 24b in opposite direction when the pendulum oscillates. However, the electric generator shaft 27 continues to be rotated by the planetary gear unit 24 in the direction that correlates to the starting direction of the pendulum oscillation.

In operation, the portable electronic device charger 5 recovers energy from any of the three sources of energy generated from within the portable electronic device charger 5. These sources of energy include (1) the energy from the oscillations of the pendulum 21, (2) the energy from the photocell array 58, and (3) the mechanical energy of a wound spring in the mechanical spring storage unit 25.

In one embodiment, the portable electronic device charger 5 may recover energy only from the energy associated from oscillations of the pendulum 21. In an alternative embodiment, the portable electronic device charger 5 may recover energy only from the energy associated with the mechanical energy of the wound spring in the mechanical spring storage unit 25. In other alternative embodiments, the portable electronic device charger 5 may recover energy from the photocell array 58 in addition to one of the other two energy sources.

Referring to FIG. 3, when the portable electronic device charger 5 is physically carried and moved, the oscillations of the pendulum 21 drive the planetary gear unit 24. The spring pawl 37a drives the gear element 24a in one direction and the spring pawl 37b drives the gear element 24b in the opposite direction.

Once the pendulum 21 starts oscillations, without a pause, starting in the clockwise direction, the planetary gear unit 24 continues to rotate the electric generator shaft 27 in clockwise direction. However, if the pendulum stops and then starts oscillations, again without pause, starting in an anticlockwise direction, the electric generator shaft 27 rotates in the anticlockwise direction.

The planetary gear unit 24 increases the angular speed of the electric generator shaft 27 as compared to the angular speed of either of the gear elements 24a or 24b. The shaft 27 drives the permanent magnet rotor (not shown) inside the electric generator 23. The electrical output of the electric generator stator (not shown) terminates on the terminals "p-n". When the rotary bracket 30 rotates together with the current collector slip ring plate 32, the riding spring loaded carbon brush pair 45 continue to carry uninterrupted the electrical output from the electric generator to the wiring board 57 in FIG. 5c.

In one embodiment of the invention, when the pendulum is in oscillating motion having reasonable inertia generated by the physical movement of the portable electronic device charger 5, the mechanical energy equivalent of the pendulum converted to electrical units is approximately half watt, corresponding to 0.1 amperes at 5 volts. Under low physical activity level, when the movement of the portable electronic device charger 5 is low, as for example, when the user of the portable electronic device charger 5 is walking, the energy equivalent of the pendulum converted to electrical units is reduced. However, this does not present a drawback to the user of the portable electronic device charger 5. As for example, if this reduced energy level is 0.25 watts corresponding to 0.05 amperes at 5 volts, and a specific small portable electronic device requires 0.2 amperes, then the user of the portable electronic device charger 5 has to be active for four minutes for every minute the user intends to operate such specific small portable electronic device.

Yet another source of energy the portable electronic device charger 5 recovers is the stored energy from the mechanical spring storage unit 25. This unit uses a wire spring (not shown) wound by the key 64. The operation of this mechanical spring storage unit 25 requires that the shaft 29 be first aligned to the axis B—B. This is done with the key alignment bushing 63 that is spring loaded.

When this key alignment bushing 63 is pushed in and the portable electronic device charger 5 rotated, the key alignment bushing 63 halts the shaft 29 and thereby aligns the shaft 29 to the keyhole along the axis B—B. After aligning the shaft 29, the spring inside the mechanical spring storage unit 25 is wound using key 64. The energy stored in the wound spring is then released to the planetary gear unit 24 when the key 64 is pushed in on the axis B—B. In turn, the planetary gear unit 24 rotates the electric generator shaft 27. Simultaneously, the axial movement of the shaft 29 disengages spring pawls 37a and 37b disabling the operation of pendulum 21. The energy stored by the mechanical spring storage unit 25 is dependent on the spring parameters. In one embodiment of the invention, the mechanical spring storage unit 25 is capable of delivering energy at a rate equivalent to 0.1 amperes at 5 volts for about a one minute duration.

Referring to FIG. 5b, another source of energy the portable electronic device charger 5 recovers is the energy from the photocell array 58 when exposed to light. The photocell array is part of the upper body 55 of the electronic module box 50. The photocell array is wired directly to the circuit shown in FIG. 5c, and delivers electrical output to the circuit from the converted sunlight. In one embodiment of the portable electronic device charger 5, the energy output of the photocell array is about half watt corresponding to 0.1 amperes at 5 volts in bright sun light.

Figure 5C:
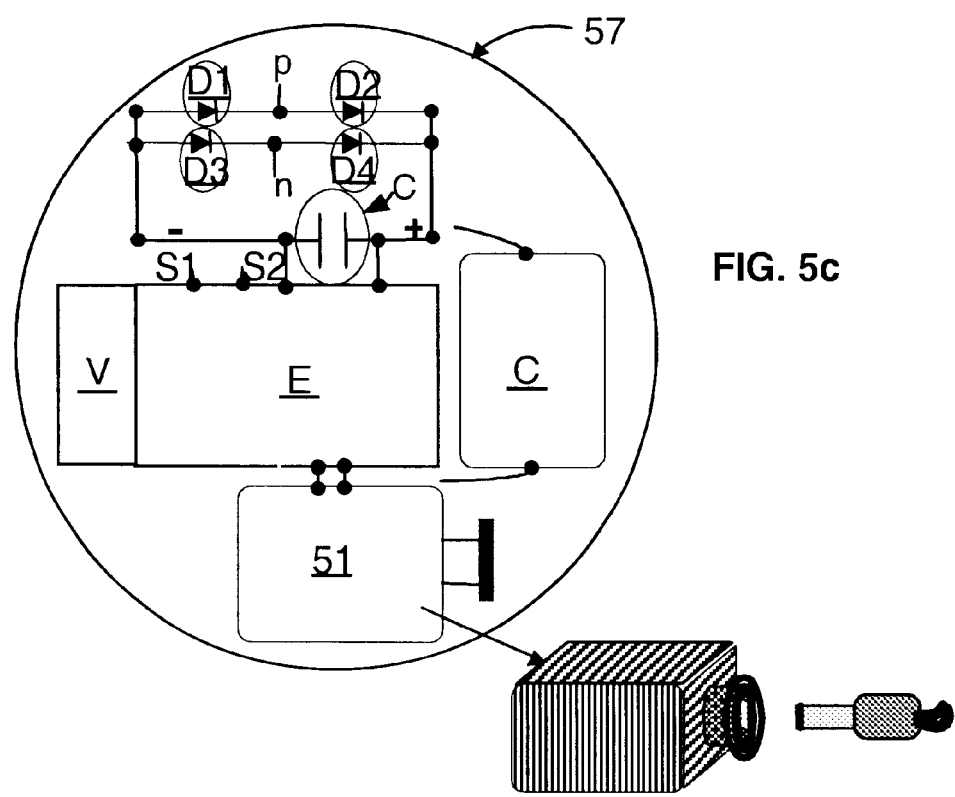
FIG. 5c illustrates an electrical schematic for one embodiment of the portable electronic device charger

FIG. 5c illustrates an electrical schematic for one embodiment of the portable electronic device charger 5. Electrical energy is derived from one of the three sources as discussed above. Referring to FIG. 5c, the electric generator feeds its output to terminals marked "p" and "n". The user of the portable electronic device charger 5 sets manually the voltage preference as for example 5 or fewer volts at the electric output socket 51 on the module "V". The diodes marked D1 through D4 convert the electric generator current to direct current. During the operation of the portable electronic device charger 5, the capacitor "C" stores the charge and reduces ripples in the electrical input to the module "E". The input from the photocell array 58 connected to the terminals marked as "S1" and "S2" is protected from reverse current feed from module "E" when the portable electronic device charger 5 is not exposed to light. The electronic module "E" controls functions that include summing up the energy recovered from the electric generator 23 and the photocell array 58, supply electrical charge to electric output socket 51 per user set requirement, limit electrical load on the electric generator 23. In one embodiment of the portable electronic device charger 5, the charging voltage and current is displayed with liquid crystal display.

Figure 9:
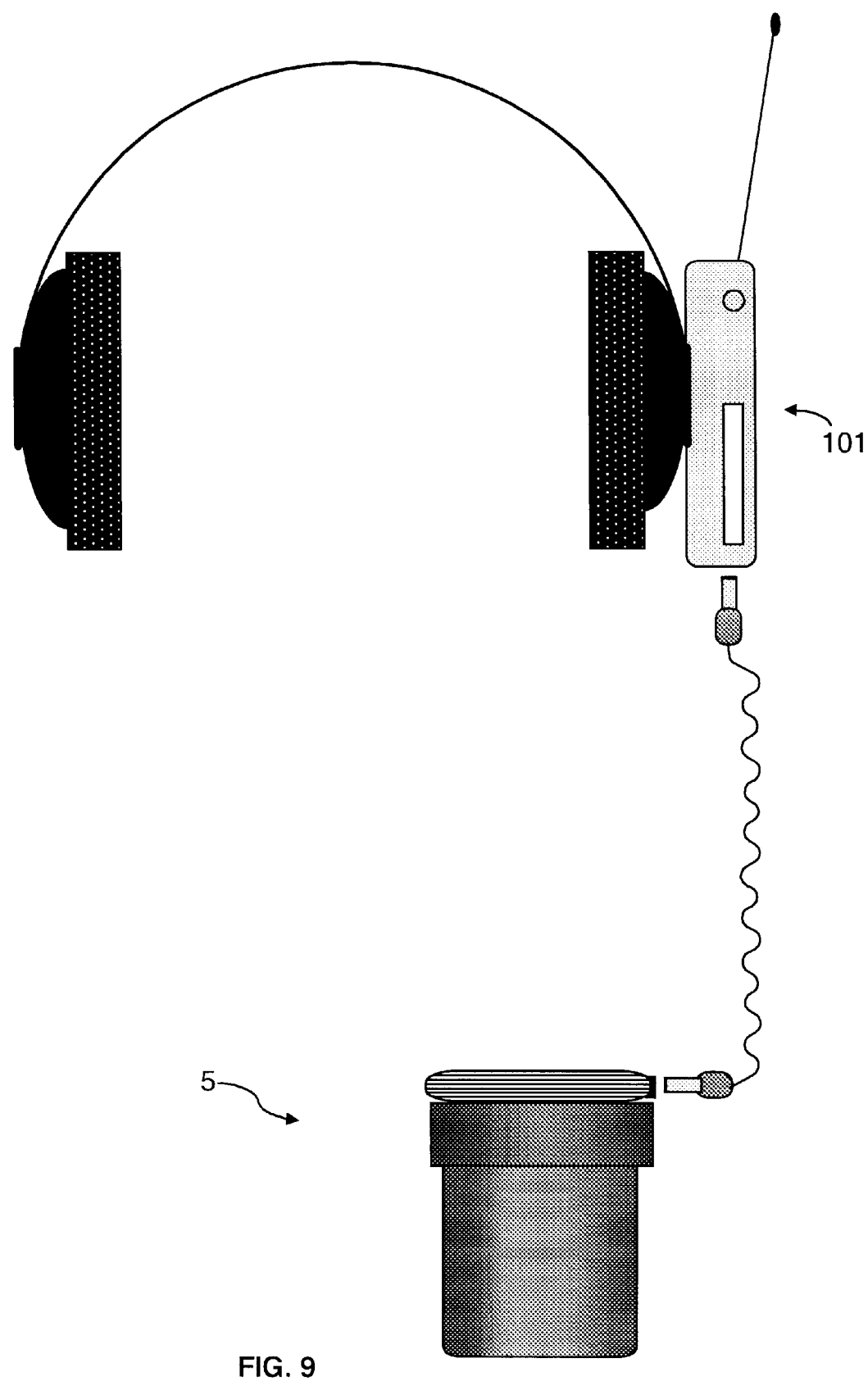
FIG. 9 illustrates an alternative embodiment of a portable electronic device charger for use with a mobile music player.

FIG. 9 illustrates an alternative embodiment of a portable electronic device charger 5 for use with a mobile music player 101. Although certain embodiments of the portable electronic device charger have been shown with a mobile phone and a mobile music player, there may be alternative embodiments where the portable electronic device charger may be used with other devices having rechargeable batteries. The invention is not limited to use with a mobile phone or a mobile music player.

In one embodiment, the portable electronic device charger may be attachable as a module to the housing of a portable electronic device for which the portable electronic device charger is supplying power. In an alternative embodiment, the portable electronic device charger may be integrated within the portable electronic as device.

A portable electronic device charger and a method for using the same have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A portable electronic device charger comprising:
   a pendulum mounted to a housing and oscillating in response to movement of the housing, the pendulum including a first trigger piece and a second trigger piece;
   a gear unit mounted to the housing including a first gear element and a second gear element, oscillation of the pendulum causing the first trigger piece to rotate the first gear element in one direction and the second trigger piece to rotate the second gear element in an opposite direction;
   an electric generator including an electric generator shaft, the electric generator shaft connected to the gear unit and driven by the gear unit to rotate, the electric generator driven by the rotation of the electric generator shaft and generating electrical output; and
   a circuit communicatively connected to the electric generator to receive the electric output and convert it to an output to be routed via an output coupling in the housing to deliver charge to a rechargeable battery in a portable electronic device.

2. The portable electronic device charger of claim 1 wherein an amount of electrical output generated by the portable electronic device charger corresponds to the amount of physical movement of a user carrying the portable electronic device charger.

3. The portable electronic device charger of claim 1 further comprising a photocell array communicatively connected to the circuit within the housing to provide electrical output from converted sunlight energy.

4. The portable electronic device charger of claim 1 further comprising an activation mechanism to be manipulated by a user.

5. The portable electronic device charger of claim 4 wherein the activation mechanism comprises:
   a key to be inserted into a key alignment bushing attached to the housing; and
   a mechanical spring storage unit including a spring to be wound by the key, energy stored by the wound spring released to activate the gear unit.

6. The portable electronic device charger of claim 5 wherein the activation mechanism includes a stop trigger to stop the pendulum from oscillating when the key is inserted into the key alignment bushing.

7. The portable electronic device charger of claim 5 wherein an amount of electrical output generated by the portable electronic device charger corresponds to the amount of turning of the key by a user.

8. The portable electronic device charger of claim 1 wherein the portable electronic device charged by the portable electronic device charger is a mobile phone.

9. The portable electronic device charger of claim 1 wherein the portable electronic device charged by the portable electronic device charger is a mobile music player.

10. The portable electronic device charger of claim 1 wherein the output coupling includes a cable extending from the portable electronic device charger to the portable electronic device.

11. A portable electronic device charger comprising:
   an activation mechanism mounted to a housing, the activation mechanism to be manipulated by a user;
   a gear unit mounted to the housing including a first gear element and a second gear element, manipulation of the activation mechanism causing rotation of the first gear element in one direction and rotation of the second gear element in an opposite direction;
   an electric generator including an electric generator shaft, the electric generator shaft connected to the gear unit and driven by the gear unit to rotate, the electric generator driven by the rotation of the electric generator shaft and generating electrical output; and
   a circuit communicatively connected to the electric generator to receive the electric output and convert it to an output to be routed via an output coupling in the housing to deliver charge to a rechargeable battery in a portable electronic device.

12. The portable electronic device charger of claim 11 wherein the activation mechanism comprises:
   a key to be inserted into a key alignment bushing attached to the housing; and
   a mechanical spring storage unit including a spring to be wound by the key, energy stored by the wound spring released to activate the gear unit.

13. The portable electronic device charger of claim 11 wherein an amount of electrical output generated by the portable electronic device charger corresponds to the amount of turning of the key by a user.

14. The portable electronic device charger of claim 11 further comprising a photocell array communicatively connected to the circuit within the housing to provide electrical output from converted sunlight energy.

15. The portable electronic device charger of claim 12 further comprising a pendulum mounted to a housing and oscillating in response to movement of the housing, the pendulum including a first trigger piece and a second trigger piece, oscillation of the pendulum causing the first trigger piece to rotate the first gear element in one direction and the second trigger piece to rotate the second gear element in an opposite direction.

16. The portable electronic device charger of claim 15 wherein the activation mechanism includes a stop trigger to stop the pendulum from oscillating when the key is inserted into the key alignment bushing.

17. The portable electronic device charger of claim 15 wherein an amount of electrical output generated by the portable electronic device charger corresponds to the amount of physical movement of a user carrying the portable electronic device charger.

18. The portable electronic device charger of claim 11 wherein the portable electronic device charged by the portable electronic device charger is a mobile phone.

19. The portable electronic device charger of claim 11 wherein the portable electronic device charged by the portable electronic device charger is a mobile music player.

20. The portable electronic device charger of claim 11 wherein the output coupling includes a cable extending from the portable electronic device charger to the portable electronic device.

21. A rechargeable battery charger comprising:
a housing to be worn by a person;
a weight mounted to the housing, movement of the person moving the housing relative to the weight;
a generator mounted to the housing, the generator having an input connected to the weight and an electric output, the generator converting mechanical power due to said relative movement to electric power provided to the electric output; and
a power outlet mounted to the housing and connected to the electric output, to which the rechargeable battery is connectable to recharge the rechargeable battery.

22. The rechargeable battery charger of claim 21 wherein the weight is a pendulum.

23. The rechargeable battery charger of claim 21 further comprising a photocell array mounted to the housing to provide electrical power from converted sunlight energy.

24. The rechargeable battery charger of claim 22 further comprising an activation mechanism to be manipulated by a user.

25. The rechargeable battery charger of claim 24 wherein the activation mechanism comprises:
a key to be inserted into a key alignment bushing attached to the housing; and
a mechanical spring storage unit including a spring to be wound by the key, energy stored by the wound spring released as input to the generator.

26. The rechargeable battery charger of claim 25 wherein the activation mechanism includes a stop trigger to stop the pendulum from moving when the key is inserted into the key alignment bushing.

27. The rechargeable battery charger of claim 25 wherein an amount of electrical power generated by the portable electronic device charger corresponds to the amount of turning of the key by a user.

28. The rechargeable battery charger of claim 21 wherein the rechargeable battery is in a portable electronic device.

29. The rechargeable battery charger of claim 28 wherein the portable electronic device is a mobile phone.

30. The rechargeable battery charger of claim 28 wherein the portable electronic device is a mobile music player.

31. A method of charging a portable electronic device comprising:
physical movement of a housing of a portable electronic device charger causing a weight to oscillate and trigger a first gear element of a gear unit to rotate one direction while a second gear element of the gear unit rotates in an opposite direction;
the gear unit causing a gear shaft to rotate;
the gear shaft driving an electrical generator to generate an electric output;
converting the electrical output; and
transferring the converted electrical output to the portable electronic device to charge a rechargeable battery in the portable electronic device.

32. The method of claim 31 further comprising:
turning a key inserted into a key alignment bushing mounted to the housing; and
causing a spring to be wound by the turning of the key, mechanical energy from the spring triggering a first gear element of a gear unit to rotate one direction while a second gear element of the gear unit to rotate an opposite direction.

33. The method of claim 31 further comprising:
converting sunlight energy using a photocell array; and
transferring the converted sunlight to the portable electronic device to charge the rechargeable battery in the portable electronic device.

34. The method of claim 31 wherein an amount of electrical output generated by the portable electronic device charger corresponds to an amount of physical movement of a user carrying the portable electronic device charger.

35. The method of claim 32 wherein an amount of electrical output generated by the portable electronic device charger corresponds to the amount of turning of the key by a user.

36. The method of claim 31 wherein the portable electronic device is a mobile phone.

37. The method of claim 31 wherein the portable electronic device is a mobile music player.

* * * * *